(12) United States Patent
Harness et al.

(10) Patent No.: US 6,330,825 B1
(45) Date of Patent: Dec. 18, 2001

(54) INTERNAL COMBUSTION ENGINE FUEL MANAGEMENT SYSTEM

(76) Inventors: Henry Harness, 2910 Whispering Oaks, #11, Pearland, TX (US) 77581; Harry Harness, 11711 Memorial Dr., #649, Houston, TX (US) 77024

(*) Notice: Subject to any disclaimer, the term of this patent is extended or adjusted under 35 U.S.C. 154(b) by 0 days.

(21) Appl. No.: 09/176,011

(22) Filed: Oct. 20, 1998

Related U.S. Application Data

(60) Provisional application No. 60/063,183, filed on Oct. 20, 1997.

(51) Int. Cl.$^7$ .................................................. G01M 19/00
(52) U.S. Cl. ......................................................... 73/118.1
(58) Field of Search ............................. 73/118.1, 119 A, 73/117.3, 23.32; 123/23

(56) References Cited

U.S. PATENT DOCUMENTS

| | | | |
|---|---|---|---|
| 3,712,275 | * 1/1973 | Jackson | 123/32 |
| 3,807,377 | * 4/1974 | Hirschler, Jr. et al. | 123/127 |
| 3,982,396 | 9/1976 | Suzuki | 60/282 |
| 3,991,566 | 11/1976 | Sami et al. | 60/289 |
| 3,992,879 | 11/1976 | Miyamori et al. | 60/288 |
| 4,033,123 | 7/1977 | Masaki et al. | 60/286 |
| 4,052,848 | 10/1977 | Ono | 60/290 |
| 4,119,073 | 10/1978 | Stock et al. | 123/547 |
| 4,123,901 | 11/1978 | Masaki et al. | 60/277 |
| 4,172,362 | 10/1979 | Mizuno et al. | 60/278 |
| 4,192,140 | 3/1980 | Yamashita et al. | 60/277 |
| 4,280,416 | 7/1981 | Edgerton | 110/254 |
| 4,336,783 | 6/1982 | Henson | 123/557 |
| 4,363,209 | 12/1982 | Atago et al. | 60/274 |
| 4,368,711 | 1/1983 | Allen | 123/522 |
| 4,476,841 | 10/1984 | Duckworth | 123/557 |
| 4,567,857 | 2/1986 | Houseman et al. | 123/3 |
| 4,592,329 | 6/1986 | Yunick | 123/545 |
| 4,594,991 | 6/1986 | Harvey | 123/557 |
| 4,637,365 | 1/1987 | Yunick | 123/545 |
| 4,705,008 | 11/1987 | Kleinholz | 123/557 |
| 4,781,165 | 11/1988 | Rawlings | 123/555 |
| 4,787,359 | 11/1988 | Blake | 123/568 |
| 4,798,058 | 1/1989 | Gregory | 62/278 |
| 4,848,302 | 7/1989 | Firey | 123/579 |
| 4,862,859 | 9/1989 | Yunick | 123/545 |
| 4,883,040 | 11/1989 | Rocky | 123/557 |
| 4,955,351 | 9/1990 | Lewis et al. | 123/557 |
| 5,062,371 | 11/1991 | Lavorel | 110/214 |
| 5,149,466 | 9/1992 | Megenbier | 261/18.2 |
| 5,179,917 | 1/1993 | Hokazono et al. | 123/184.45 |
| 5,197,447 | 3/1993 | Dick | 123/557 |
| 5,205,264 | 4/1993 | Hoffman, Sr. | 123/555 |
| 5,218,944 | 6/1993 | Leonard | 123/557 |
| 5,226,400 | 7/1993 | Birch | 123/557 |
| 5,253,617 | 10/1993 | Fitzpatrick et al. | 123/184.54 |
| 5,271,224 | 12/1993 | Cruickshank | 60/314 |

(List continued on next page.)

Primary Examiner—Benjamin R. Fuller
Assistant Examiner—Octavia Davis
(74) Attorney, Agent, or Firm—Howrey Simon Arnold & White, LLP

(57) ABSTRACT

A fuel management system for an internal combustion engine including an intake manifold is presented. The fuel management system includes a thermal reactor having an inlet port and an outlet port. The thermal reactor receives liquid fuel through the inlet port and is adapted to heat the liquid fuel and discharge fuel vapor through the outlet port. A pressure sensing device is configured to measure pressure within the intake manifold to determine engine load. A plenum is adapted to receive the fuel vapor from the outlet port and mix the fuel vapor with air, and the plenum is adapted to be connected to the intake manifold to provide the fuel vapor and air mixture to the intake manifold. A fuel metering device is operable to regulate the amount of fuel vapor provided to the plenum in response to the pressure sensing device.

30 Claims, 8 Drawing Sheets

U.S. PATENT DOCUMENTS

| | | | |
|---|---|---|---|
| 5,322,046 | 6/1994 | Birch et al. | 123/494 |
| 5,343,848 | 9/1994 | Birch et al. | 123/557 |
| 5,351,664 | 10/1994 | Rotter et al. | 123/196 AB |
| 5,394,838 | 3/1995 | Chandler | 123/25 C |
| 5,400,969 | 3/1995 | Keene | 239/136 |
| 5,408,973 | 4/1995 | Spangjer | 123/478 |
| 5,435,288 | 7/1995 | Schmal | 123/527 |
| 5,482,024 | 1/1996 | Elliott | 123/516 |
| 5,535,621 * | 7/1996 | Glidewell et al. | 73/119 A |
| 5,542,398 | 8/1996 | Marcon | 123/527 |
| 5,564,273 | 10/1996 | Shah | 60/274 |
| 5,598,813 | 2/1997 | Masuda et al. | 123/65 PE |
| 5,711,282 | 1/1998 | Lang et al. | 123/549 |

* cited by examiner

INTERNAL COMBUSTION ENGINE FUEL MANAGEMENT SYSTEM

CROSS-REFERENCE TO RELATED APPLICATION

This application claims the benefit of U.S. Provisional Patent Application No. 60/063,183, filed Oct. 20, 1997, which is incorporated herein by reference in its entirety.

BACKGROUND OF THE INVENTION

1. Field of the Invention

The invention relates to internal combustion engines, and more particularly, to a fuel management system for an internal combustion engine fueled by a liquid hydrocarbon.

2. Description of Related Art

The operation of internal combustion engines is well known. In an internal combustion engine, combustion of fuel takes place in a confined space, producing expanding gases that are used to provide mechanical power. The most common internalcombustion engine is the four-stroke reciprocating engine used in automobiles. Here, mechanical power is supplied by a piston fitting inside a cylinder. On a downstroke of the piston, the first stroke, fuel that has been mixed with air (by fuel injection or using a carburetor) enters the cylinder through an intake valve via an intake manifold. The intake manifold is a system of passages that conduct the fuel mixture to the intake valves. The piston moves up to compress the mixture at the second stroke. At ignition, the third stroke, a spark from a spark plug ignites the mixture, forcing the piston down. In the exhaust stroke, an exhaust valve opens to vent the burned gas as the piston moves up. A rod connects the piston to a crankshaft. The reciprocating (up and down) movements of the piston rotate the crankshaft, which is connected by gearing to the drive wheels of the automobile.

A diesel engine is another type of internal-combustion engine. It is generally heavier and more powerful than the gasoline engine and burns diesel fuel instead of gasoline. It differs from the gasoline engine in that, among other things, the ignition of fuel is caused by compression of air in its cylinders instead of by a spark. The speed and power of the diesel are controlled by varying the amount of fuel injected into the cylinder.

In this disclosure, a fuel is defined as a substance that can be burned by supplying air and a sufficient amount of heat to initiate combustion. A liquid hydrocarbon fuel, such as gasoline or diesel fuel, must be converted to a gas before it can be ignited. This liquid to gas vapor conversion is required because the molecules of fuel must be well mixed with the molecules of air before they can chemically react with each other to give off heat.

However, not all of the liquid fuel must be converted to a gas before combustion can occur. Just enough fuel needs to be converted to a gas so that the mixture of gas molecules and air molecules falls within the fuel's flammability limits—which refers to the minimum and maximum concentration percentages, by weight, of fuel in air that will burn. If the concentration of the gaseous fuel in air is less than the minimum or greater than the maximum flammability limit, the fuel and air mixture will not ignite. Known internal combustion engines and fuel delivery systems are inefficient in converting the liquid fuel to a gaseous state. Therefore, the fuel and air molecules cannot mix properly for complete combustion.

In a gasoline engine employing a standard automotive throttle body fuel injection system, this inefficiency is due at least in part to the high velocity of the air and fuel mixture passing the fuel injection's throttle body, which may reduce the inlet temperature as low as 40° F. (4° C.). The flash point temperature—the temperature at which the fuel will give off enough vapor to form a combustible mixture with air—for gasoline is 45° F. (7° C.). This reduction in inlet temperature reduces the amount of heat available from the atmosphere to evaporate the fuel. Since less ambient heat is available, more energy from compressing the mixture is required to evaporate the fuel.

Gasoline engines have a throttle valve to control the volume of intake air. The amount of fuel and air that goes into the combustion chamber regulates the engine speed is and, therefore, engine power. This causes continuous changes in the atmospheric air velocity due to the pressure differential between the atmosphere and the intake manifold. These pressure variations cause the size of the particles of atomized fuel to vary throughout the engine's RPM range. As a result, there is a wide variation in fuel droplet size in the air stream. Therefore, the fuel droplets have less surface area exposed to the air for evaporation and more heat is required to fully evaporate the fuel.

Once the fuel vapor and air mixture leaves the throttle body injector and enters the intake manifold, the mixture velocity is so high that some of the fuel droplets are centrifuged out of the air stream when they make turns. This occurs because the fuel droplets are heavier than air. This varies that portion of the mixture's stoichiometric fuel to air ratio, even though the overall air to fuel ratio of the mixture flowing through the fuel injector is correct. The portion of the mixture that contains the fuel that was centrifuged out of the main air stream reduces the amount of surface area exposed by the fuel to the air for evaporation. This increases the amount of energy required to evaporate it. Once this portion of the fuel mixture is evaporated, it burns rich since the original portion of this mixture was rich from the fuel being centrifuged out of the main air stream. Carbony residues that accumulate in the combustion chambers and darker areas on the piston tops indicate areas of excessive fuel richness during combustion.

Conversely, portions of the air stream that are lean, but still fall within the flammability limits, will burn and cause extremely high temperatures. Auto-ignition temperature refers to the temperature at which a mixture of air and fuel will spontaneously ignite without open flame, spark, or a hot spot. The auto-ignition temperature of gasoline is 495° F. (275° C.). When these localized high temperature areas reach high enough pressure and temperature, autoignition of the end gases will result, causing detonation, which is the uncontrolled combustion or explosion caused by autoignition of the end gases that were not consumed in the normal flame front reaction. Detonation results in the familiar "ping" or "spark knock" sound.

The engine's heat of compression during the compression stroke produces heat that begins to evaporate the air and fuel mixture in the cylinder. However, this compressing of the mixture increases the pressure. As a result, the increased pressure increases the boiling point of the fuel for evaporation. Evaporation continues slowly because these relationships are not linear. So enough fuel evaporates, allowing it to fall within its flammability limits. Then the spark plug ignites the mixture and creates a flame front. This flame front during the combustion process has the same effect of increasing the boiling point of the fuel so its critical temperature is never reached. Therefore, the remaining atomized fuel droplets do not evaporate before or during combustion. Since the droplets are not vaporized, they do not burn.

When the cylinder pressure falls due to the descent of the piston while on the power stroke, the fuel droplets that were not evaporated earlier now evaporate due to a lower boiling point and higher cylinder temperature. These evaporated fuel droplets now burn, but they burn too late into the crankshaft angle for producing power. Thus, less is power and high exhaust gas temperatures result.

Direct (intake) port fuel injection has better fuel distribution characteristics than a throttle body fuel injection system. However, they allow very little time to evaporate fuel in the intake port. Therefore, the heat of compression must heat the air/fuel mixture for evaporation before combustion can occur. This system has the same inherent inefficiencies regarding the engine's heat of compression, which increases the boiling point of the fuel. Therefore, as the cylinder pressure rises, the critical temperature is never reached. The remaining fuel droplets do not burn in time to produce power. Thus, less power and high exhaust gas temperatures still result.

The heat of combustion (the temperature in the cylinder due to combustion) for gasoline is 840° F. (449° C.) plus or minus 40° F. (4° C.) above ambient. Conventional automotive exhaust gas temperatures are 1,400 to 1,500° F. (760 to 815° C.). This temperature difference (heat energy) between the exhaust gas temperature and the heat of combustion is totally wasted as excessive exhaust gas temperature. Even the engine's cooling system must be enlarged to dissipate the higher exhaust gas temperatures due to the increased temperature differential around the exhaust side of the combustion chambers and exhaust ports. This wasted heat energy is dissipated to the atmosphere through the vehicle's radiator, and an equal amount of wasted heat energy is dissipated through the vehicle's exhaust pipes as excessively high exhaust gas temperatures.

The remaining fuel that did not chemically react in the combustion chamber or in the exhaust manifold then enters a 2,000° F. (1,093° C.) catalytic converter for combustion. The unburned fuel that escapes the catalytic converter enters the atmosphere as hydrocarbon and carbon-monoxide pollutants. Moreover, currently produced catalytic converters are only effective when the engine is at operating temperature, so it has no effect on cold start emission levels.

Similar shortcomings exist with known diesel engines. In diesel engines with indirect fuel injection (precombustion chamber), the engine's heat of compression during the compression stroke produces heat that begins to evaporate the air and fuel mixture in the cylinder. However, this compressing of the mixture increases the pressure. As a result, the increased pressure increases the boiling point of the fuel for evaporation. Evaporation continues slowly because these relationships are not linear, and just enough of the aromatics in the diesel fuel evaporate allowing it to fall within its flammability limits. The flash point temperature of the aromatics is low enough for the air and fuel mixture to auto-ignite, which results in a flame front. This flame front ignites more of the fuel mixture during the combustion process; however, it has the same effect of increasing the boiling point of the fuel so its critical temperature is never reached. Therefore, the remaining liquid fuel droplets do not evaporate before or during combustion.

Diesel engines with direct-injection (DI) have even greater fuel vaporization problems. In a diesel engine with DI high turbulence combustion chambers, the fuel spray pattern elongates in response to air flow. The smaller fuel droplets concentrate on the leading (lower) edge of the spray pattern while the larger and heavier droplets remain clustered about the core.

Ignition begins as a series of small bursts at the interface between the fuel spray and cylinder air, where there is surplus of oxygen. The bursts combine into flame fronts that progressively move into the fuel-soaked core of the pattern. Every normal combustion event in a diesel engine begins under oxygen-rich conditions and concludes under oxygen-lean conditions. This variability in fuel/air ratios is a special burden of the diesel engine. In addition, diesel engines operate under a fairly wide range of loads and speeds. Air turbulence, duration of the expansion stroke (power), and cylinder temperature vary with the operating mode.

Hydrocarbons survive their passage through the cylinder when the mixture is either too lean or too rich to burn. Excessively lean mixtures are caused by fuel droplets that break free of spray plume and diffuse throughout the combustion chamber. The resulting fuel mixture does not support combustion, and the raw fuel exists through the exhaust. This phenomenon often occurs under light loads and at low engine speeds, which causes high hydrocarbon emission spikes during idle. Hydrocarbon emissions are also generated when the flame is quenched by too rapid infusion of air or by contact with the relatively cool cylinder walls.

Particulate Matter (PM) in high concentrations that accompany diesel acceleration and cold starts can be seen as black smoke. The hydrocarbon component of PM, referred to as soluble organic fraction (SOF), consists of combustion by-products, lube oil and unburned fuel. Soot, the SOF carrier, forms in the oxygen-poor (rich fuel mixture) region on the trailing edge of the fuel plume. Oxides of nitrogen (NOx) are created in the high-temperature, oxygen-rich combustion (fuel-lean mixture) that occurs on the leading edge of the spray plume. Most soot forms early in the combustion process when fuel accumulates during the ignition lag period, then burns at extremely high temperatures to form NOx.

When the cylinder pressure falls due to the descent of the piston while on the power stroke, the fuel droplets that were not evaporated earlier now evaporate due to a lower boiling point and higher cylinder temperature. These evaporated fuel droplets now burn, but they burn too late into the crankshaft angle for producing power. Thus, less power, high emission levels, and high exhaust gas temperatures result.

The heat of combustion for diesel fuel is 500 to 550° F. (260 to 288° C.) above ambient. Convention diesel exhaust gas temperatures are 1,100 to 1,300° F. (593 to 704° C.). As with a gasoline engine, this temperature difference (heat energy) between the diesel exhaust gas temperature and the heat of combustion is totally wasted as excessive exhaust gas temperature. Thus, the engine's cooling system must be enlarged to dissipate the higher exhaust gas temperatures due to the increased temperature differential around the exhaust side of the combustion chambers and exhaust ports. This wasted heat energy is dissipated to the atmosphere through the vehicle's radiator, and an equal amount of wasted heat energy is dissipated through the vehicle's exhaust pipes as excessively high exhaust gas temperatures.

The present invention addresses some of the above mentioned, and other, shortcomings associated with the prior art.

SUMMARY OF THE INVENTION

In one aspect of the present invention, a fuel management system for an internal combustion engine is presented. The internal combustion engine includes, among other things, an intake manifold, and the fuel management system includes a thermal reactor having an inlet port and an outlet port. The thermal reactor receives liquid fuel through the inlet port, and is adapted to heat the liquid fuel and discharge fuel vapor through the outlet port. A pressure sensing device is configured to measure pressure within the intake manifold to determine engine load, and a plenum is adapted to receive the fuel vapor from the outlet port and mix the fuel vapor with air. The plenum is adapted to be connected to the intake manifold to provide the fuel vapor and air mixture to the intake manifold. A fuel metering device is operable to regulate the amount of fuel vapor provided to the plenum in response to the pressure sensing device.

In another aspect of the invention, a thermal reactor for converting a liquid hydrocarbon fuel to a fuel vapor includes a cylinder defining an axial bore therethrough. The cylinder further defines an inlet port adapted to receive the liquid hydrocarbon fuel, and an outlet port adapted to discharge the fuel vapor. At least one heating element is connected to the cylinder and is arranged to heat the liquid hydrocarbon fuel to convert the liquid fuel to the fuel vapor.

In yet another aspect of the present invention, a system for preventing cylinder over scavenging during the overlap period of a camshaft in an internal combustion engine is provided. The engine includes an exhaust manifold and an exhaust pipe coupled thereto. The system includes a pressure sensor to measure back pressure of exhaust gas from the engine and a control valve coupled to the exhaust pipe. The control valve is responsive to the pressure sensor to restrict the exhaust gases and apply back pressure on the engine.

In a still further aspect, a method of dynamically mapping operating parameters of an engine is provided. The method includes configuring a plurality of measurement devices to indicate a plurality of engine parameters, operating the engine, recording the outputs of the measurement devices while the engine is operating, and playing back the recorded outputs at predetermined time intervals. In a particular embodiment, the recording of the outputs comprises video taping the outputs of the measurement devices.

BRIEF DESCRIPTION OF THE DRAWINGS

Other objects and advantages of the invention will become apparent upon reading the following detailed description and upon reference to the drawings in which.

Figure 1:
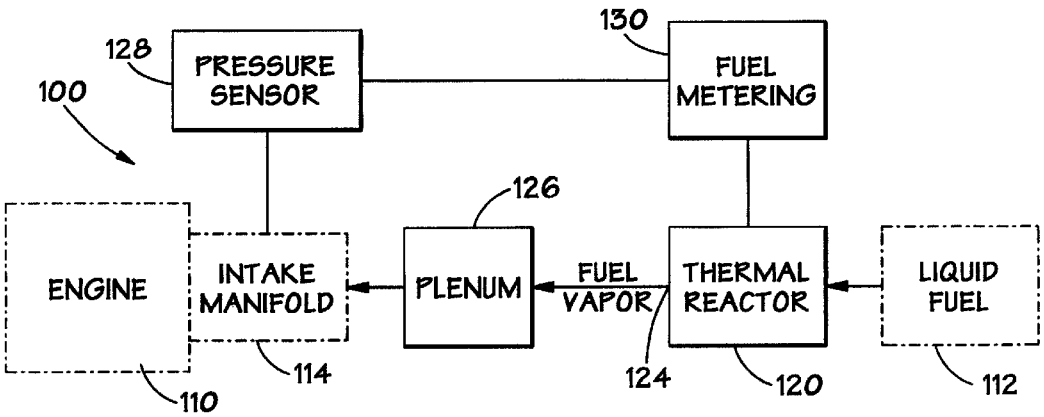
FIG. 1 is a block diagram illustrating a fuel management system in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It is will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a block diagram illustrating a fuel management system 100 in accordance with one embodiment of the present invention. Specific embodiments of the present invention are configured for use as an add-on system for an original equipment manufacture's (OEM) engine. The fuel management system 100 is adapted for use with an internal combustion engine 110 using a liquid hydrocarbon fuel 112, such as gasoline, diesel fuel, kerosene, alcohols, etc., which is typically contained in a fuel tank. Among other things, the engine 112 includes an intake manifold 114 for conducting an air/fuel mixture to the intake valves (not shown) of the engine 112.

The exemplary fuel management system 100 includes a thermal reactor 120 having an inlet port 122 and an outlet port 124. The thermal reactor 120 receives liquid fuel 112, typically from a vehicle's fuel tank, through the inlet port 122. The thermal reactor 120 heats the liquid fuel 112 to convert it to fuel vapor, which is then discharged through the outlet port 124. A plenum 126 receives the fuel vapor and thoroughly mixes it with air. The fuel vapor and air mixture then flows from the plenum 126 to the intake manifold 114 to provide the fuel vapor and air mixture to the intake manifold. A pressure sensing device 128 is configured to measure pressure within the intake manifold 114 to determine engine load, and a fuel metering device 130 is operable to regulate the amount of fuel vapor provided to the plenum 126 in response to the pressure sensing device 128, thus providing the leanest possible air to fuel vapor ratio for the engine 112 load condition. In certain embodiments adapted for use with a turbocharged engine, such turbocharged diesel engine, the engine's native turbocharger may provide the function of the plenum 126. Hence, the plenum 126 would not be necessary in such an implementation, and the fuel vapor from the thermal reactor 120 would be provided directly to the turbocharger.

The fuel metering device 130 may be situated in various positions relative to the thermal reactor 120 in accordance with various embodiments of the invention. In a particular embodiment, such as the system 101 illustrated in FIG. 2, the fuel metering device 130 is connected to the outlet port 124 of the thermal reactor 120, such that the fuel vapor passes from the thermal reactor 120 outlet port 124, through the fuel metering device 130, to the plenum 126. In another alternative embodiment shown in FIG. 3, the fuel metering device is coupled to the inlet port 122 of the thermal reactor 120, such that the liquid fuel 112 passes through the fuel metering device 130 to the thermal reactor inlet 122.

Figure 4:
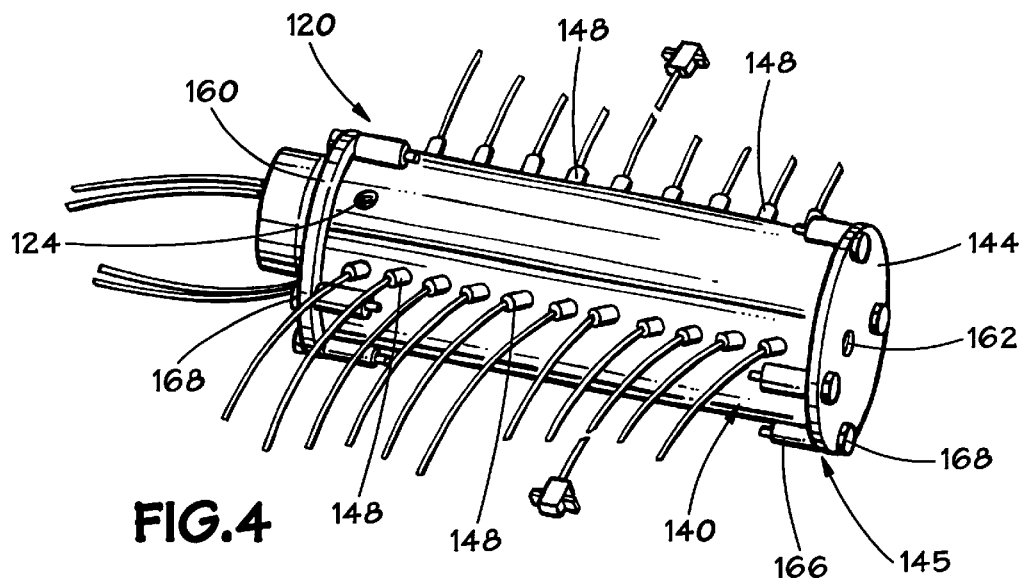
FIG. 4 is a side view of an embodiment of a thermal reactor in accordance with the present invention.
Figure 5:
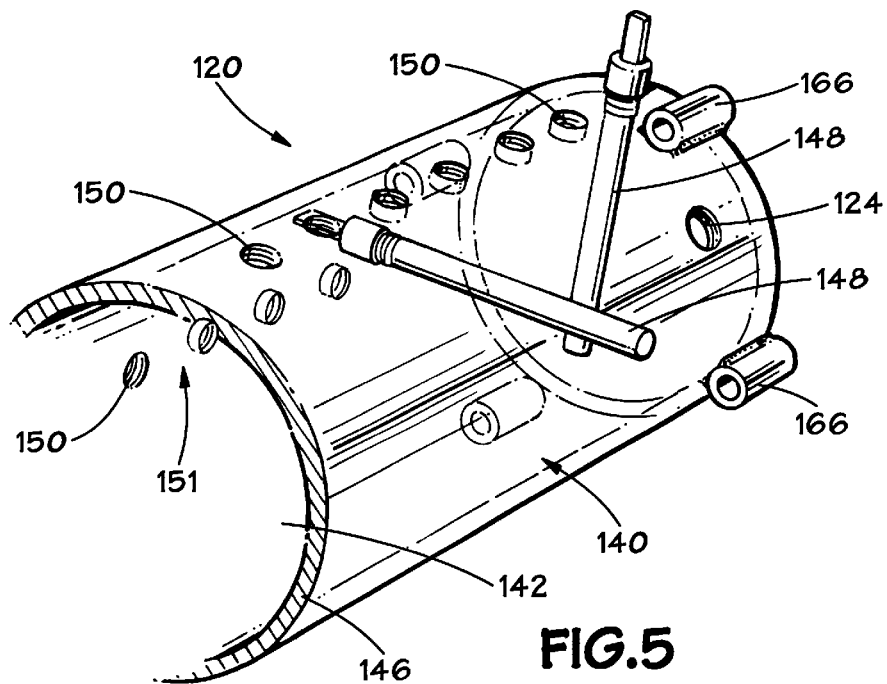
FIG. 5 is a front perspective view of a cylinder suitable for a thermal reactor such as the embodiment illustrated in FIG. 4.

Turning now to FIG. 4 and FIG. 5, an exemplary thermal reactor 120 in accordance with a particular embodiment of the invention is illustrated. The thermal reactor 120 functions to heat liquid fuel to convert it to a fuel vapor, and further, it serves as a surge tank of fuel vapor to meet engine demands while liquid fuel is being processed. The thermal reactor 120 comprises a cylinder 140 defining an axial bore 142 therethrough. The cylinder 140 is adapted to receive the liquid fuel 112 from the inlet port 122 and discharge the fuel vapor through the outlet port 124. In the particular embodiment illustrated in FIG. 4 and FIG. 5, a first end plate 144 that is connected to a first end 145 of the cylinder 140 defines the inlet port 122, and a side wall 146 of the cylinder 140 defines the outlet port 124. At least one heating element 148 is provided to heat the liquid fuel and thus, to convert the liquid fuel to the fuel vapor.

The thermal reactor 120 shown in FIG. 4 and FIG. 5 includes a plurality of heating elements 148 disposed in the cylinder 140, with the heating elements 148 arranged such that the liquid fluid contacts the heating elements 148. The side wall 146 of the cylinder 140 has a plurality of apertures 150 extending therethrough, with each of the apertures 150 having one of the heating elements 148 extending therethrough, so that each heating element 148 projects into the cylinder 140 (only two heating elements 148 are shown extending through the apertures 150 in FIG. 5 to simplify the illustration). In certain embodiments, each of the heating elements 148 is positioned generally perpendicular to the axis of the cylinder 140, and each of the apertures 150 has a corresponding aperture 150 located about 90 degrees therefrom, as illustrated in FIG. 5. More specifically, the apertures 150 are arranged in two columns, with each column being generally parallel to the axis of the cylinder 140 and positioned about 90 degrees apart.

In one specific embodiment of the thermal reactor 120, the cylinder 140 is about 12.125 inches (30.80 cm) long, with a diameter of about 4.0 inches (10.2 cm). Each of the columns 151, 152 of apertures 150 includes 12 apertures, for total of 24 apertures 150 extending through the cylinder 140. Each aperture 150 is 0.375 inches (0.95 cm) in diameter and is threaded. The apertures 150 are positioned such that the center of the first aperture 150 of the first column 151 is 1.3125 inches (3.33 cm) from the first end 145 of the cylinder 140, and the first aperture 150 of the second column 152 is 0.9375 inches (2.38 cm) from the first end 145 of the cylinder 140. The remaining apertures 150 are spaced 0.975 inches (2.48 cm) on center. The outlet port 124 comprises a threaded 0.5 inch (1.27 cm) opening. Vulcan 250 watt cartridge heaters are suitable heating elements 148. In one embodiment, 12 volts DC is used to power the heating elements 148.

Figure 6:
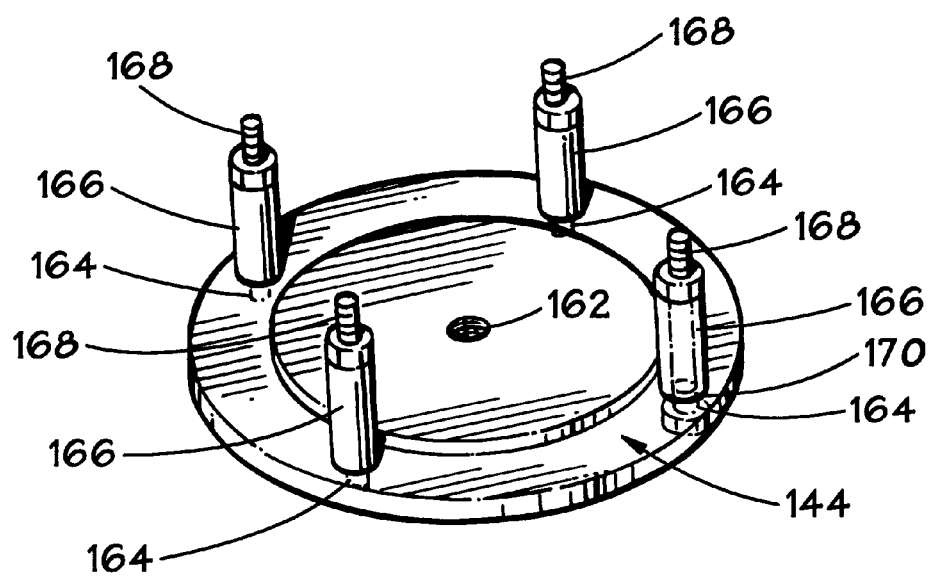
FIG. 6 is a perspective view of a first end plate for a thermal reactor such as the embodiment illustrated in FIG. 4.
Figure 7:
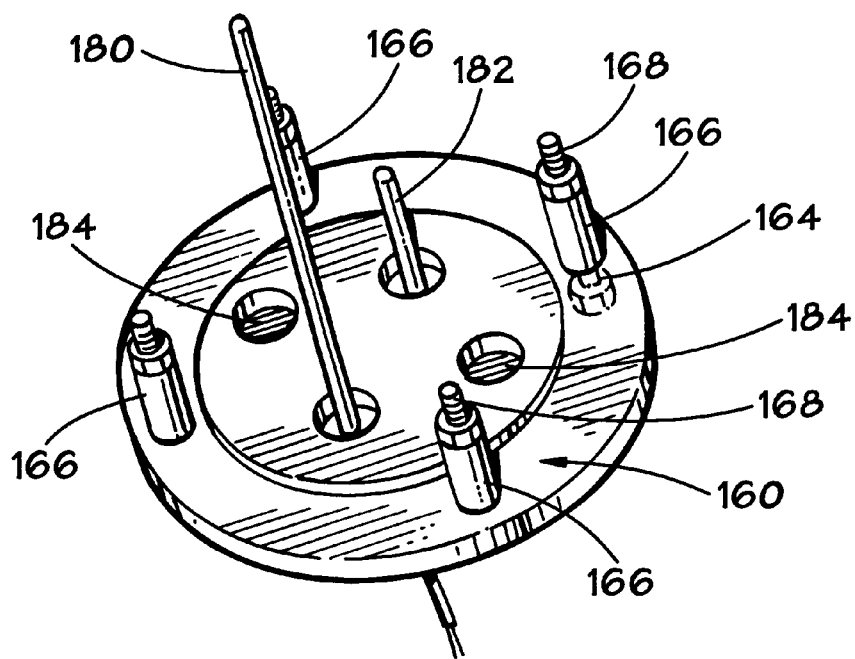
FIG. 7 is a perspective view of a second end plate for a thermal reactor such as the embodiment illustrated in FIG. 4.

FIG. 6 and FIG. 7 illustrate embodiments of first and second end plates 144, 160, respectively, adapted for use with the cylinder 140 illustrated in FIG. 5. Referring to FIG. 6, the first end plate 144 defines an opening 162 therethrough to accommodate the inlet port 122. The first end plate 144 further defines four bolt holes 164 extending therethrough about the periphery of the first end plate 144, with four generally cylindrical spacers 166 associated with each of the bolt holes 164. Four coupling feet 170 corresponding to the bolt holes 164 are connected to the cylinder 140 (shown in FIG. 4). Four bolts 168 extend through the bolt holes 164, the spacers 166, and the coupling feet 170, and washers and nuts (not shown) are placed about the bolts 168 to affix the first end plate 144 to the cylinder 140 in a sealing relationship.

In one embodiment, the first end plate 144 is 0.375 inches (0.952 cm) thick with a diameter of 6 inches (15.24 cm). The inlet port opening 162 comprises a threaded 0.125 inch (0.318 cm) opening, and the bolt holes 164 each comprise threaded 0.250 inch (0.635 cm) openings. The spacers 166 are each 1.250 inches (3.175 cm) long, and the bolts 168 are each 2.50 inches (6.35 cm) long with 0.25 inch (0.635 cm) washers and nuts. The first end plate 144 further defines a sealing lip 172, which in one embodiment, is 3.997 inches (10.152 cm) in diameter and extends 0.125 inches (0.318 cm) above the surface of the first end plate 144.

Turning now to FIG. 7, the second end plate 160 includes bolt holes 164, spacers 166 and bolts 168 to connect the second end plate 160 to the cylinder 140 via the coupling feet 170 in a manner similar to the first end plate 144 as disclosed in conjunction with FIG. 6. In a particular embodiment, the second end plate 160 further defines openings through which a K-type thermocouple 180, a pressure sensor 182, and two high temperature thermal switches 184 extend. Suitable devices include a model K thermocouple, a Hobbs 76062 NC pressure sensor, and Vulcan Cal-stat 1c1c5 high temperature thermal switches. These components function as part of a feedback system to maintain a preset pressure and temperature in the thermal reactor 120. One high temperature thermal switch 184 is used for overtemperature protection of the thermal reactor, while the other switch 184 is used for starter interrupt until the thermal reactor 120 has reached its operating temperature.

In some implementations of the fuel management system 100, the heating elements 148 are operated such that the temperature of the specific heating elements 148 varies to achieve the desired conversion of the liquid fuel to a fuel vapor. Varying the temperature of the heating elements 148 by approximately 200° F. (93° C.) from one end of the thermal reactor 120 to the other creates a vortex that spreads the liquid fuel across inside surface of the cylinder, providing maximum surface area for heating the liquid fuel to convert it to a fuel vapor. In a particular embodiment, the thermal reactor 120 includes a brass (or other heat-conducting material) matrix within the cylinder 140 that is heated by the heating elements 148. The vortex created by varying the temperature of the heating elements 148 causes the liquid fuel to spread about the brass matrix to increase the surface area for heating the liquid fuel. The brass matrix also helps insure that liquid fuel is maintained in the thermal reactor 120 until it is completely vaporized.

Figure 8:
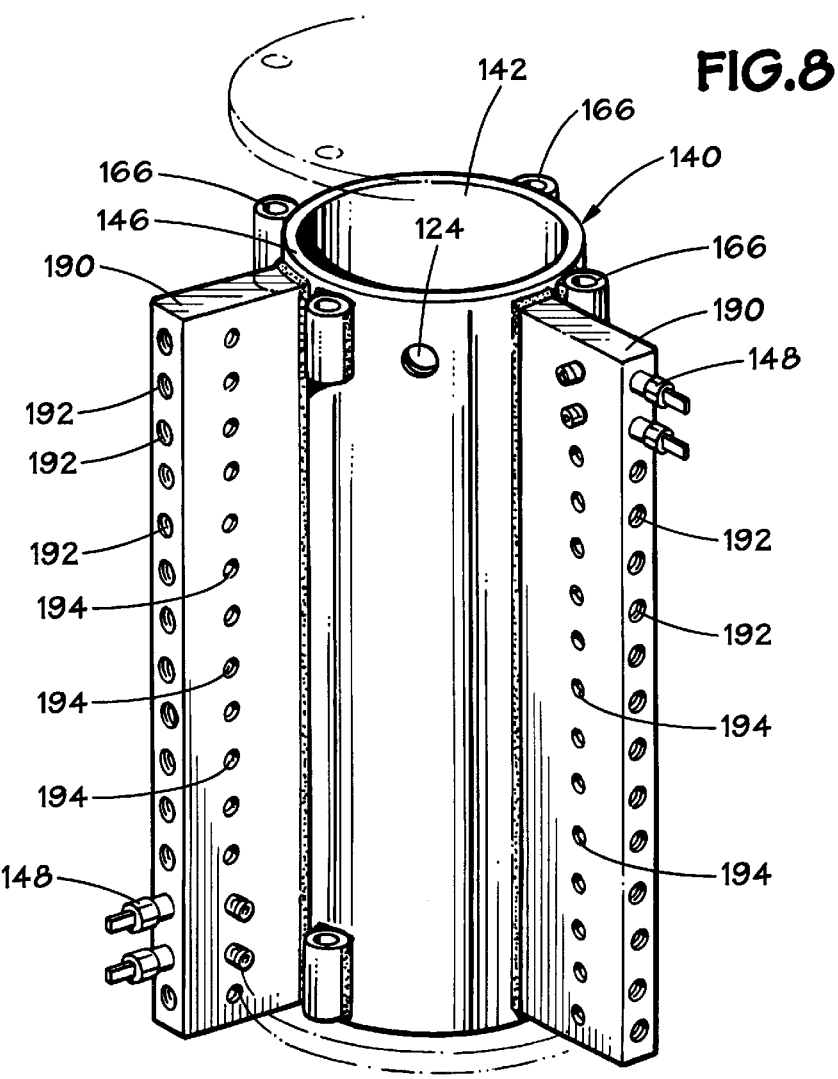
FIG. 8 is a perspective view of a cylinder adapted for an alternative embodiment of a thermal reactor in accordance with the present invention.

FIG. 8 illustrates an alternate configuration for heating the liquid fuel 112 to transform it to fuel vapor in accordance with another embodiment of the present invention. At least one fuel bar 190 is connected to the side wall 146 of the cylinder 140. Two fuel bars 190 are used in the particular embodiment illustrated in FIG. 8. Each fuel bar 190 defines at least one fuel well (not shown) therein. The side wall 146 of the cylinder 140 defines a plurality of openings that correspond to openings in each fuel well, such that, when the fuel bars 190 are coupled to the cylinder 140 as shown in FIG. 8, the fuel wells are in fluid communication with the cylinder 140. Each fuel well defines an inlet port 122 that is adapted to be connected to the fuel source such that the liquid fuel 112 flows into the fuel well. In one embodiment, each fuel well includes a fuel fitting situated to perpendicularly intersect the fuel well. Each fuel well has a heating element 148 associated therewith disposed within the fuel bar 190, so as to heat the liquid fuel 112 within the fuel well to convert the liquid fuel 112 to the fuel vapor. The fuel vapor then enters the cylinder 140 and flows out of the cylinder 140 through the outlet port 124.

In one embodiment, each fuel bar 190 is 16 inches (40.64 cm) long, 4 inches (10.16 cm) high, and 1 inch (2.54 cm) wide. Each fuel bar 190 defines 24 fuel wells, which each comprise a bore 192 extending through the fuel bar 190. One end of each bore 192 cooperates with a corresponding opening in the side wall 146 of the cylinder 140, and the other end of the bore 192 has a heating cartridge (not shown) inserted therein. Suitable heating cartridges include Bosch 80025, which are heated to a temperature of about 1,450° F. to 1,472° F. (788° C. to 800° C.). In a particular embodiment, the fuel wells are lined with brass inserts to improve the conduction of heat through the bores 192. The fluid inlet ports 122 each comprise a 0.3125 inch (0.7938 cm) hole 194 extending 0.900 inch (2.286 cm) into the side of the fuel bar 190 generally perpendicular to the bores 192 for the fuel wells. Each of the holes 194 for the inlet ports 122 may be provided with a filter to filter the liquid fuel 112 entering the fuel bar 190.

The thermal reactor 120 of the fuel management system of the present invention addresses problems associated with known internal combustion engines using liquid hydrocarbon fuels. The thermal reactor 120 allows a complete phase change from liquid gasoline to a gaseous state without the associated restriction of volume. All heavy ends of the liquid fuel are vaporized so it does not drip. The thermal reactor 120 converts the liquid fuel to a vapor which puts enough random kinetic energy into the fuel so critical temperature can be reached in the cylinder and the heat of condensation does not return the fuel to a liquid state.

Figure 2:
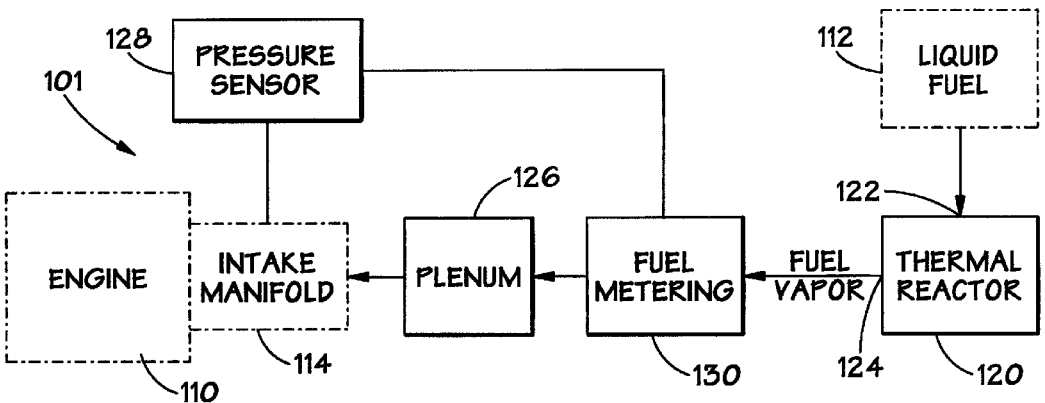
FIG. 2 is a block diagram illustrating a fuel management system in accordance with an alternative embodiment of the present invention.
Figure 3:
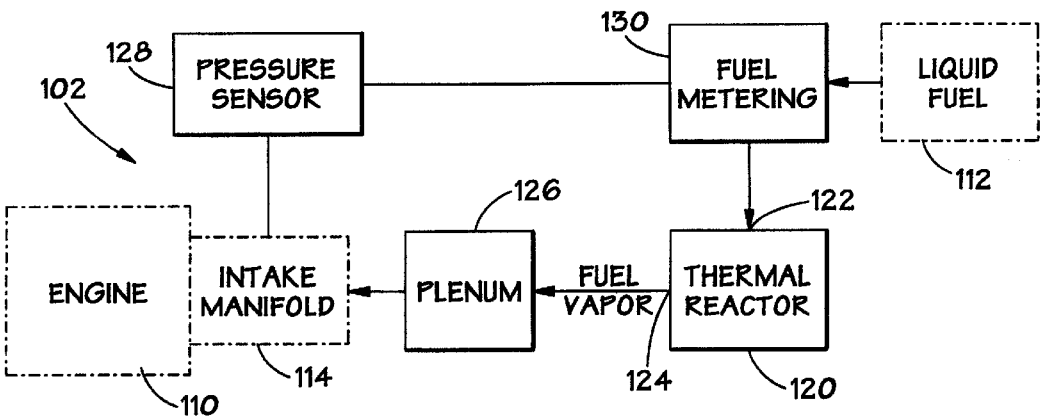
FIG. 3 is a block diagram illustrating a fuel management system in accordance with another alternative embodiment of the present invention.

In the particular fuel management system 101 illustrated in FIG. 2, the hot fuel vapor exits the outlet 124 of the thermal reactor 120 and enters the fuel metering device 130. In one embodiment, the fuel vapor exits the thermal reactor at about 650° F. (343° C.). The purpose of the fuel metering device 130 is to operate the engine 110 as fuel lean as possible for the engine's particular load condition. To this end, a fuel metering device 130 in accordance with one embodiment of the invention is operable between first and second stages in response to the pressure sensing device 128 to regulate the air to fuel vapor ratio based on the load condition of the engine 110. The first stage provides fuel vapor from the thermal reactor 120 to the plenum 126 at a first rate to achieve a first predetermined air to fuel vapor ratio, and the second stage provides fuel vapor from the thermal reactor 120 to the plenum 126 at a second rate to achieve a second predetermined air to fuel vapor ratio.

In a specific embodiment, the first stage is maximum lean, and the second stage increases the fuel to air vapor ratio for acceleration. Once the acceleration requirement is met, the second stage of the fuel metering device 130 returns the fuel vapor flow to the best lean requirement for the engine load. In other words, the first stage is economy cruise, and the second stage is for power.

Figure 9:
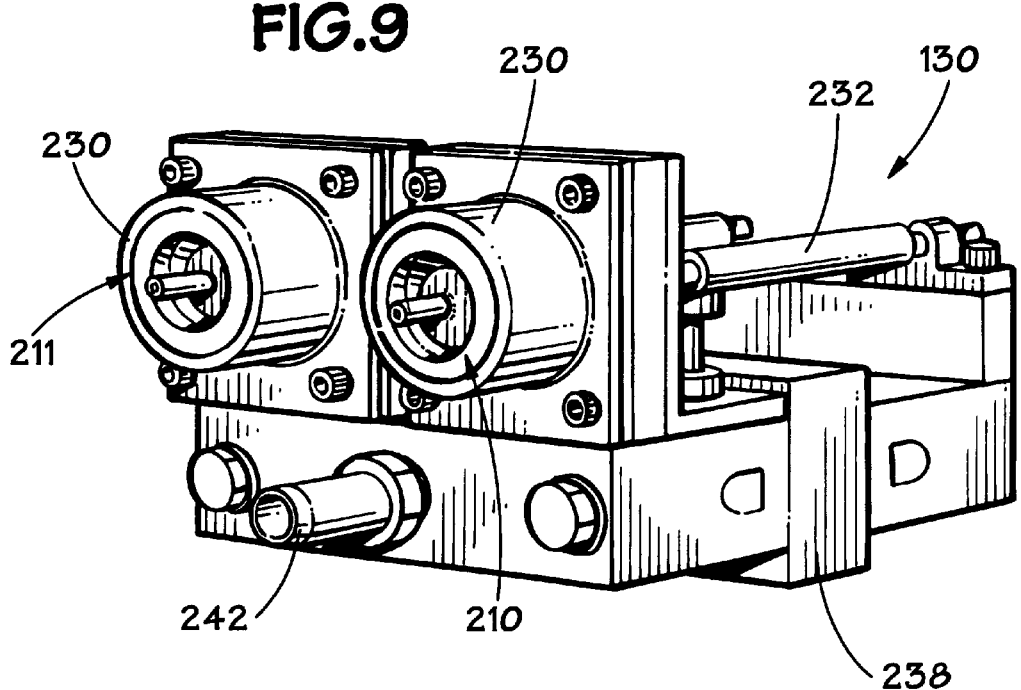
FIG. 9 is a front perspective view of a fuel metering device in accordance with an embodiment of the present invention.
Figure 10:
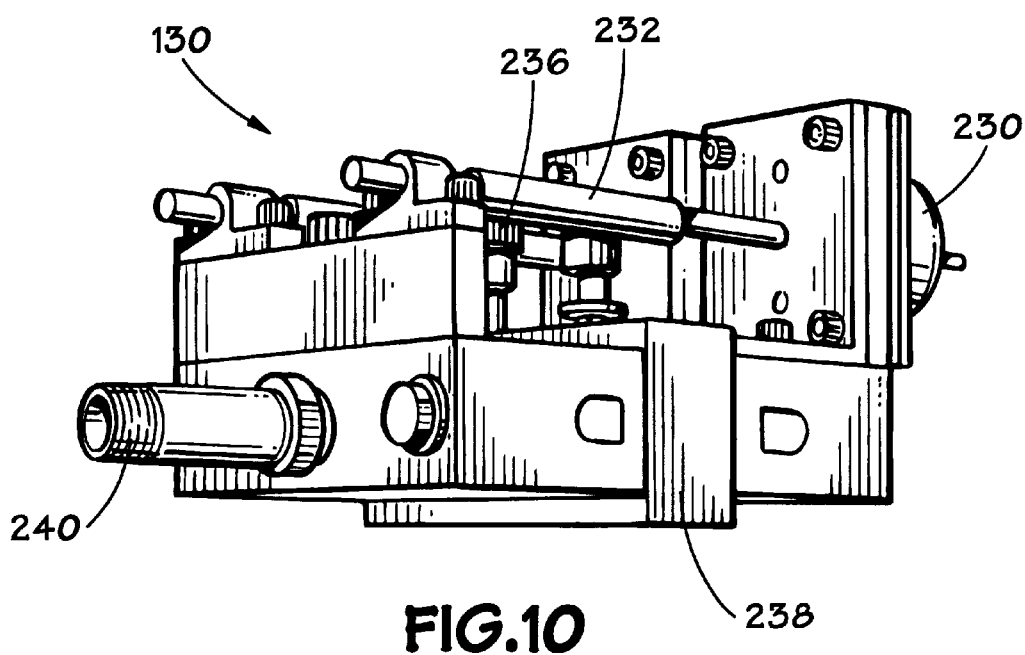
FIG. 10 is a top perspective view of the fuel metering device shown in FIG. 9.
Figure 11:
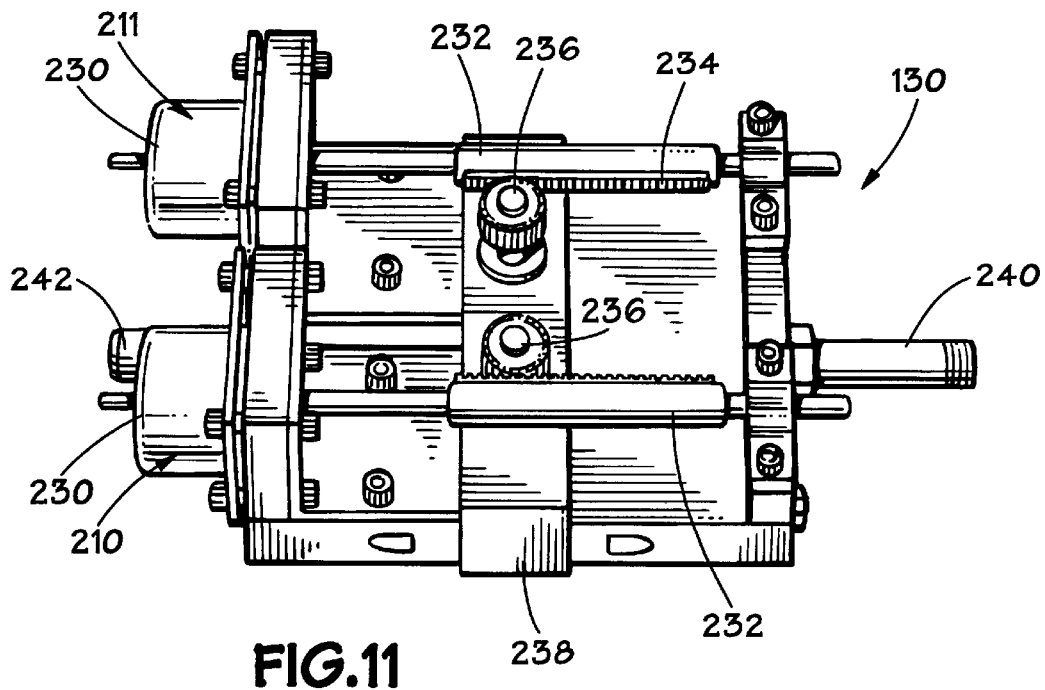
FIG. 11 is a side perspective view of the fuel metering device shown in FIG. 9.
Figure 12:
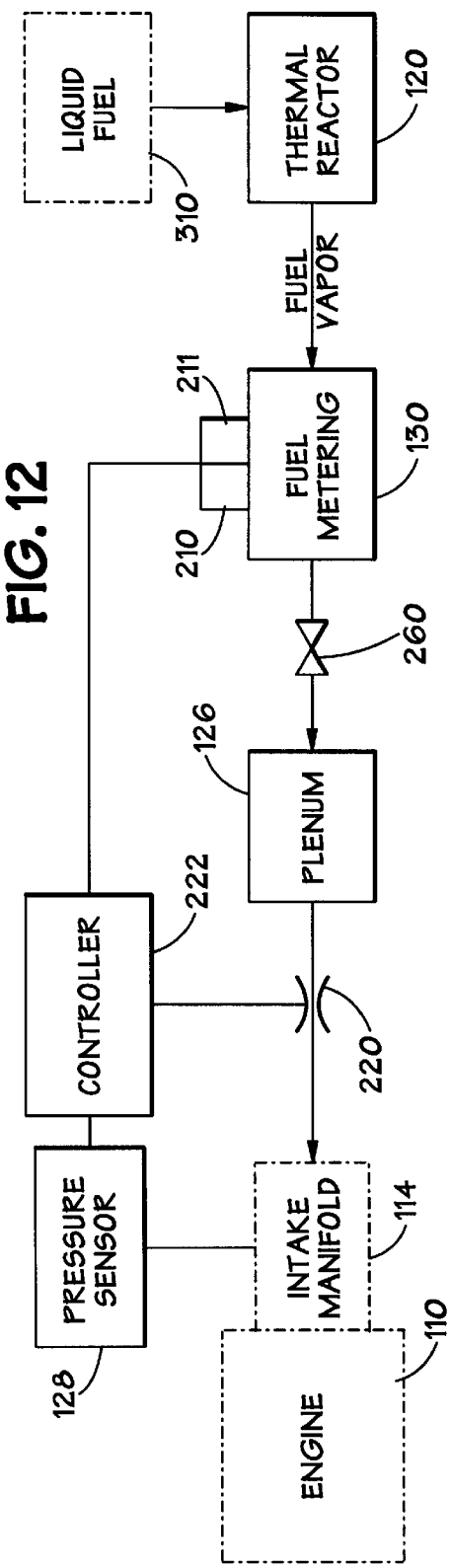
FIG. 12 is a block diagram illustrating a fuel management system in accordance with yet another alternative embodiment of the present invention.

An exemplary fuel metering device 130 is illustrated in FIG. 9, FIG. 10 and FIG. 11. The fuel metering device 130 is operated by two rotary vacuum motors 210, 211. In other embodiments, other drive mechanisms are used, such as positive pressure. FIG. 12 is a block diagram illustrating a fuel management system 103 in accordance with an alternative embodiment of the invention, further including an intake air venturi 220 coupled to the intake manifold 114 to provide a vacuum source for operating the vacuum motors 210, 211. A controller 222 receives an output signal from the pressure sensing device 128 and in response thereto, switches the fuel metering device 130 between the first and second stages. In the embodiment illustrated, the controller 222 provides a vacuum signal from the venturi 220 to drive the vacuum motors 210, 211.

In one embodiment, the controller 222 comprises a programmable logic array, such as a model Bimbo 1224DC010DC, which is programmed using ROM MAX 4G software. The controller 222 operates the fuel metering device 130 in response to engine load conditions as determined by the pressure sensing device 128, which may comprise a Sierra model 600 air flow meter. Other system parameters used for controlling the fuel metering device 130 may include, but are not limited to, mass air flow, throttle position, engine speed, and liquid fuel temperature.

Referring to FIG. 11, each of the vacuum motors 210, 211 includes a cylinder 230 and a drive shaft 232 having rack gear 234 thereon. In one embodiment, the rack gear 234 include 32 teeth per inch (12.6 teeth per cm). The rack gear 234 cooperates with drive gears 236 extending from a metering block 238. Each drive gear 236 is coupled to Is a respective rotary valve (not shown) disposed within the fuel metering device 130. The fuel metering device 130 further includes a fuel vapor inlet 240 and a fuel vapor outlet 242.

In the fuel management system 103 illustrated in FIG. 12, liquid fuel enters the thermal reactor 120 and is completely converted to a fuel vapor, which exits the thermal reactor 120 and enters the fuel metering device 130. The controller compares the pressure within the intake manifold 114 as determined by the pressure sensor 128 and the vacuum signal from the intake air venturi 220, and sends a vacuum signal to the vacuum motors 210, 211 to operate the fuel metering device 130 so as to provide the leanest possible air to fuel vapor ratio for the engine's 112 load requirement.

More specifically, the fuel metering device 130 utilizes two stages. The first stage of the fuel metering device 130 is used for economy cruise. In this mode, the engine 10 will not produce maximum horsepower because more air and less fuel is being introduced thus providing a very lean air/fuel mixture. The second stage increases the air/fuel vapor ratio up to stoichiometeric thus providing the maximum air/fuel ratio for acceleration and power. In the vacuum system, two vacuum actuated Barksdale model d1h-h18ss switches are used to measure intake manifold 114 vacuum (engine load) and venturi 220 vacuum (engine RPM). When the throttle position changes, a vacuum differential switch, such as a Barksdale Vacuum Differential Switch model 0–30 hg, senses the corresponding change in intake manifold vacuum. This switch then sends a corresponding vacuum signal to the vacuum motor associated with the first stage, for example, the vacuum motor 210, if the vehicle is cruising, or to the vacuum motor 211 associated with the second stage if the vehicle is accelerating.

Figure 13:
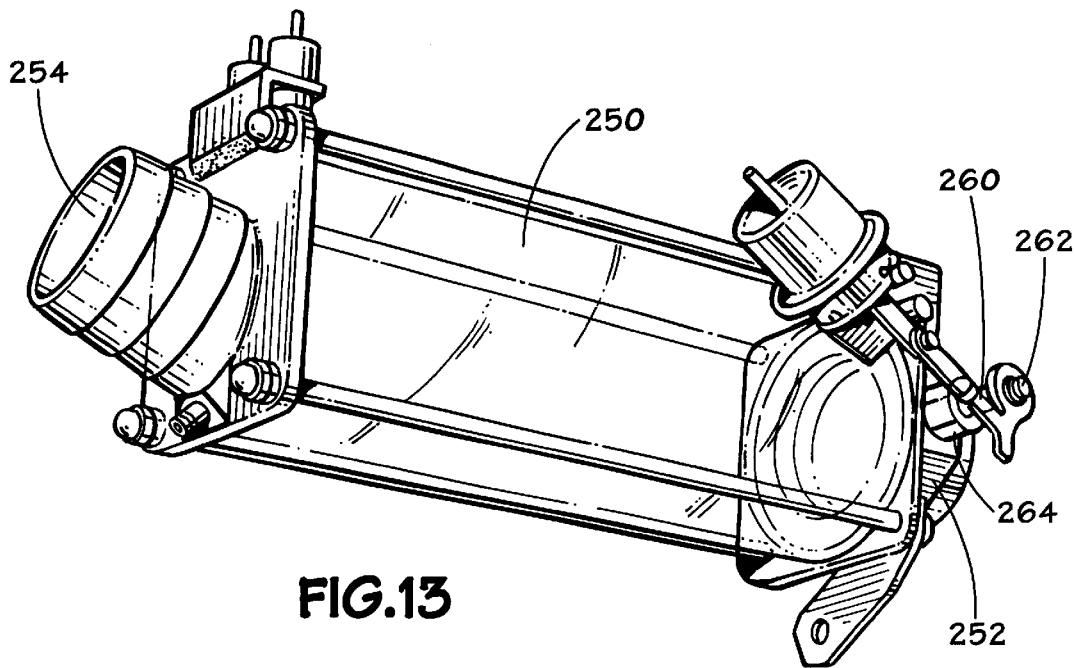
FIG. 13 is a perspective view of a plenum in accordance with an embodiment of the present invention.

Turning now to FIG. 13, an exemplary embodiment of the plenum 126 is illustrated. The plenum provides more time for the air and fuel vapor to mix for enhanced combustion. It also provides additional mass to dampen the reflecting waves that bounce off of the engine's intake valves when they close, thereby preventing intake air from backing out of the engines intake manifold 114. The plenum 130 illustrated in FIG. 13 includes a generally cylindrical central portion 250, an inlet end 252 through which the air and fuel vapor is received, and an outlet end 252, which is adapted to be connected to the intake manifold 114. The central portion 250 may suitably be fabricated out of brass 360, stainless steel 420, or a ceramic material. In a particular embodiment, glass is used for the central portion 250 to allow visual observation of the air and fuel vapor mixture flowing through the plenum. In one embodiment, the cylindrical central portion 250 is about 10 inches (25.4 cm) long with a diameter of 4 inches (10.16 cm), though these dimensions will vary dependent on the engine's intake velocity range.

The particular fuel management system of the present invention that is illustrated in FIG. 12 includes an intake air velocity control valve 260 coupled between the fuel metering device 130 and the plenum 126. Referring to the plenum illustrated in FIG. 13, the intake air velocity control valve 260 is coupled to the inlet end 252 of the plenum 126. The intake air velocity control valve 260 is operated, for example, by a vacuum motor 261, and includes an air inlet 262 at a first end, and a second end 264 that is coupled to the inlet end 252 of the plenum. The intake air velocity control valve 260 defines an air flow path (not shown) between the air inlet 262 and the second end 264, and a variable air flow restrictor (not shown) positioned within the air flow path. In one embodiment, a butterfly valve is used, and in another embodiment, a rotary valve is used.

In the fuel management system 103 illustrated in FIG. 12, the hot fuel vapor leaves the fuel metering device 130 and flows through the intake air velocity control valve 260. The intake air velocity control valve 260 increases the engine's volumetric efficiency at low speeds by increasing the speed of the air and fuel vapor mixture, allowing more air to enter the engine's 110 combustion chamber while the intake valve is open. Further, a vane in the throat of the intake air velocity control valve 260 causes the intake air to swirl, resulting in a vortex that thoroughly mixes the air and fuel vapor molecules as they enter the plenum 126. The intake air velocity control valve 260 is operated to maintain a predetermined vacuum (for example, 10 in/h20 vacuum) on the plenum 126. As discussed above, the plenum 126 provides additional time for the air and fuel vapor to mix, allowing the mixture to completely combust.

From the engine's intake manifold 114, the air and fuel vapor mixture enters the engine's 110 combustion chamber where it burns and exits the exhaust system at high velocity, common with all internal combustion engines. The high exhaust velocity creates a vacuum in the exhaust pipes, which is used to pull fresh air into the engine's cylinders during the camshaft overlap period of the intake stroke. This improves volumetric efficiency and maximum engine torque. This pulse scavenging of the cylinders is typically tuned for the engine's RPM associated with maximum torque. However, at any engine speed below maximum torque, the engine is over scavenged, resulting in a lower torque curve at lower engine speeds. This is an engineering compromise associated with known internal combustion engines.

Figure 14:
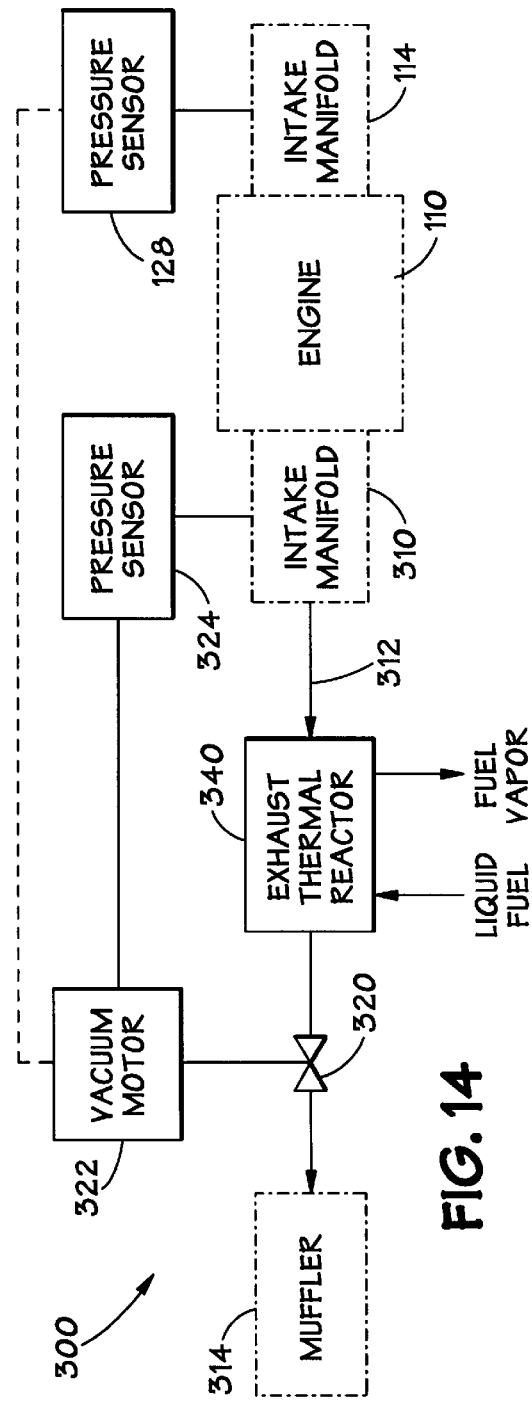
FIG. 14 is a block diagram illustrating an exhaust control system in accordance with an embodiment of the present invention.

FIG. 14 illustrates an exhaust control system 300 in accordance with an embodiment of the fuel management system of the present invention. The exhaust control system 300 prevents or reduces cylinder over scavenging during the overlap period of the camshaft in the internal combustion engine 110. The exhaust gas flows from an exhaust manifold 310, through an exhaust pipe 312 to a muffler 312. An exhaust velocity control valve 320 is connected between the exhaust manifold 310 and the muffler 312 to restrict the exhaust gas velocity just to the point that nominal back pressure prevents fresh air from entering the exhaust manifold 310—typically at low speed. In one embodiment, a rotary valve is used for the exhaust velocity control valve 320. A vacuum motor 322, for example, may be used to operate the exhaust velocity control valve 320 in response to a pressure sensor 324 that is adapted to determine the exhaust gas back pressure. In the illustrated embodiment, the pressure sensor 324 is coupled to the exhaust manifold. The vacuum motor 322 may operate the exhaust velocity control valve 320 in response to additional, or other, desired engine parameters, such as engine load (as determined by the pressure sensor 128) and RPM requirements.

In another specific embodiment of the fuel management system, an exhaust system thermal reactor 340 is coupled to the exhaust manifold 310 so as to use spent exhaust gas energy for partial heating of the liquid hydrocarbon fuel. In a system employing the exhaust system thermal reactor 340, the exhaust velocity control valve 320 further functions to insure that the exhaust system thermal reactor 340 is filled with exhaust gases throughout the range of engine conditions. The exhaust system thermal reactor 340, however, only provides heating of the liquid fuel 112 when the engine 110 is at operating temperature. Thus, the exhaust system thermal reactor 340 is used for partial heating of the liquid fuel; the thermal reactor 120 controls the final fuel vapor outlet temperature and provides cold start capability.

Figure 15:
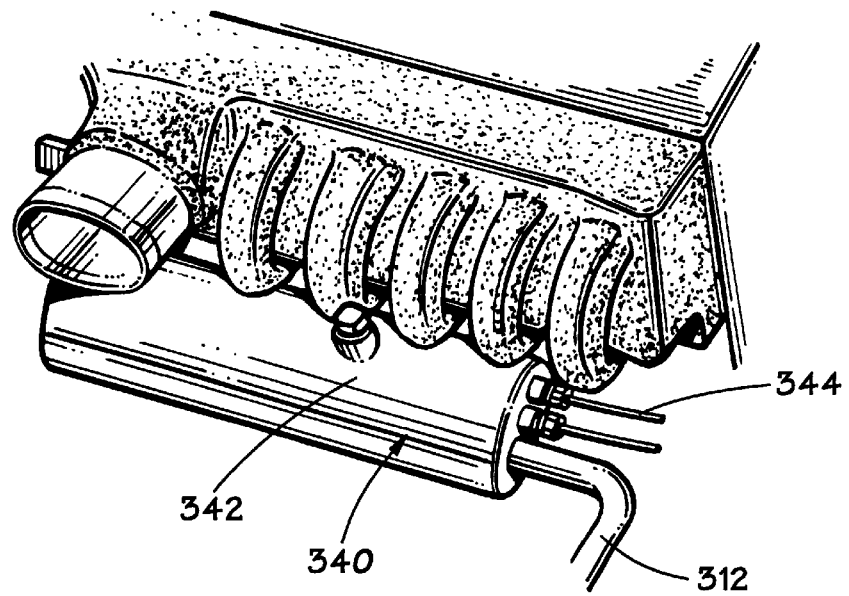
FIG. 15 is a perspective view of an exhaust system thermal reactor in accordance with the present invention.

FIG. 15 illustrates an exemplary embodiment of an exhaust system thermal reactor 340. The exhaust system thermal reactor 340 comprises a round cylinder 342 that is packed with a conductive matrix (not shown). The exhaust pipe 312 passes through the center of the cylinder 342 to heat the matrix. A fuel dispersion tube 344 is positioned above the exhaust pipe 312 to spray liquid fuel through the matrix and over the exhaust pipe 312. The fuel dispersion tube 344 defines a plurality of holes for distributing the liquid fuel. In a particular embodiment, the fuel dispersion tube defines 56 holes, each having a diameter of 0.015 inch (0.381 mm). The holes are arranged with an included angle of 90° drilled longitudinally on the tube to distribute the liquid fuel evenly over the exhaust pipe 312 and through the matrix, thus providing the maximum surface area for heating the fuel.

Some internal combustion engines, such as a gasoline engine, use a spark ignition system. Diesel engines use an auto-ignition system. When the fuel management system, and particularly the thermal reactor of the present invention, is used in conjunction with a is diesel engine, auto-ignition of the air and fuel vapor mixture is no longer possible.

Figure 16:
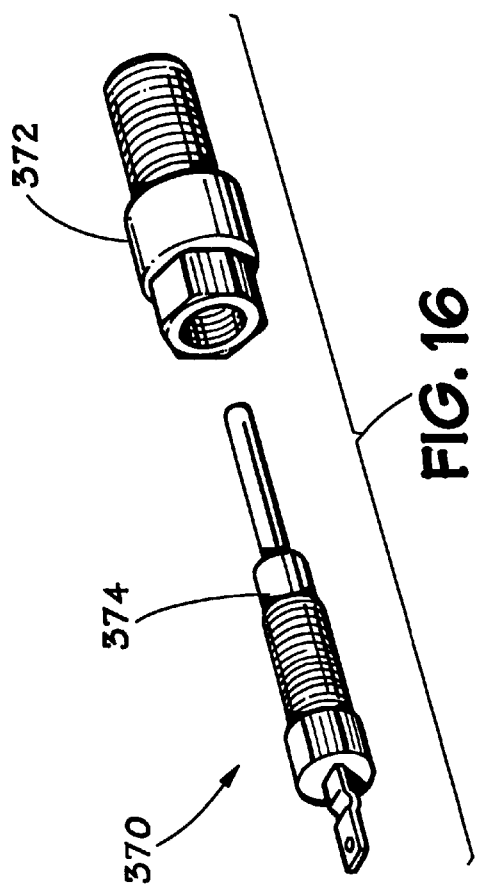
FIG. 16 illustrates a glow plug system in accordance with an embodiment of the present invention.

Therefore, another form of ignition is necessary. In accordance with aspects of the invention, a combustion chamber glow plug system is provided. The glow plug system is illustrated in FIG. 16 The glow plug system 370 includes a plurality of adapters 372 for replacing diesel fuel injector nozzles with diesel engine glow plugs 374, such as Delco 11G glow plugs, such that at least a portion of the glug (i.e., the glow plug tip) extends into the engine's combustion chamber or pre-combustion chamber. This provides a source of fuel mixture ignition, instead of the auto-ignition method typically used with diesel engines.

In one embodiment of the glow plug system 370, the tip temperature of the glow plugs 372 is varied from 1,200° F. to 1,550° F. (649° C. to 843° C.). A control module 376 controls the tip temperature in response to predetermined engine parameters, such as engine load and RPM, thus providing a mechanism for advancing or retarding the engine's ignition timing based on the desired engine parameter. An example of a suitable control module 376 is a Red Lion PAXT0000 that includes an ECG2764 EPROM. The system is responsive to the intake manifold pressure sensor 128 (engine load) and a tach sensor (engine RPM). When the engine load increases, manifold vacuum decreases which lowers the temperature of the glow plugs 372. At idle speed, the temperature of the glow plugs 372 is about 1,550° F. (843° C.), and the temperature decreases to about 1,200° F. (649° C.) under full load. When the engine RPM exceeds maximum torque, the control module 376 is programmed to increase the glow plug 372 temperature to compensate for the engine's loss in volumetric efficiency. In a specific embodiment, the temperature of the glow plugs 372 is increased by the same percent as the volumetric efficiency loss.

In accordance with another aspect of the present invention, a novel process for dynamically mapping operating parameters of the engine 112 is provided. Calibrating or otherwise adjusting the multiple components of an engine system, such as the fuel management system of the present invention, requires simultaneously studying and analyzing a myriad of engine operating parameters. To further complicate the analysis, the engine parameters are constantly changing depending on the engine load, speed, etc.

Figure 17:
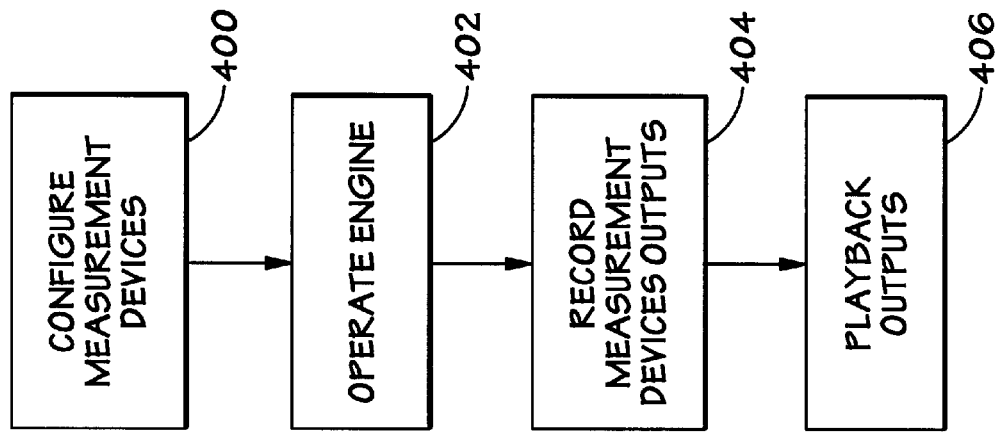
FIG. 17 is a flow diagram illustrating a mapping process in accordance with an embodiment of the present invention.

FIG. 17 is a flow diagram illustrating a mapping process in accordance with the present invention. In block 400, a plurality of measurement devices are configured to indicate a plurality of engine parameters to be analyzed. In block 402, the engine is operated as desired. The outputs of the measurement devices are then recorded while the engine is operating in block 404. After the engine has been operated for the desired time, and/or through the desired operational criteria, the recorded outputs are played back at predetermined time intervals in block 406. This allows the technician to view the recorded parameters at any given time as desired to analyze various parameters occurring simultaneously, even if a given parameter occurs for only a short time period. For example, the outputs of the measurement devices may be recorded on a digital recording device, such as a personal computer hard disk, or the outputs may be video taped.

A Panasonic Pro 456AG video camera is a suitable video tape recorder. In specific implementations, the recorded parameters include fuel vapor pressure, intake manifold pressure, temperature, relative humidity, altitude, engine oil temperature, battery voltage, liquid fuel pressure, engine coolant temperature, etc. Further, a performance computer, such as a Veri-Com VC2000 performance computer, may be used to measure and display other parameters in real time, which may then be recorded for subsequent play back in accordance with the method of the present invention. Such parameters include G-force, time, speed, distance, horsepower, RPM, torque and gear ratio. Further, these parameters are measured at 0.01 second intervals.

Thus, the present invention provides a system that may be used in conjunction with conventional internal combustion engines using liquid hydrocarbon fuels, such as gasoline, diesel, methanol, ethanol, etc. The fuel management system permits complete combustion of the air and fuel vapor mixture, thereby significantly reducing exhaust emission levels and improving fuel economy. Moreover, the system disclosed herein functions to reduce cold start emissions to levels comparable to natural gas or propane fueled vehicles.

It will be appreciated by those of ordinary skill in the art having the benefit of this disclosure that the embodiment illustrated above is capable of numerous variations without departing from the scope and spirit of the invention. It is fully intended that the invention for which a patent is sought encompasses within its scope all such variations without being limited to the specific embodiment disclosed above. Accordingly, the is exclusive rights sought to be patented are as described in the claims below.

What is claimed is:

1. A fuel management system for an internal combustion engine including an intake manifold, the fuel management system comprising:
   a thermal reactor having an inlet port and an outlet port, the thermal reactor receiving liquid fuel through the inlet port, the thermal reactor heating the liquid fuel to convert the liquid fuel to a fuel vapor and discharge the fuel vapor through the outlet port;
   a pressure sensing device for measuring pressure within the intake manifold to determine engine load;
   a plenum connected to the outlet port to receive the fuel vapor from the outlet port and mix the fuel vapor with air;
   a fuel metering device connected to the pressure sensing device for regulating the fuel vapor provided to the plenum in response to the pressure sensing device; and
   an air intake velocity valve connected to the plenum, the air intake velocity valve controlling the air provided to the plenum in response to the pressure sensing device.

2. The fuel management system of claim 1, wherein the fuel metering device is connected to the outlet port of the thermal reactor, such that the fuel vapor passes from the outlet port of the thermal reactor through the fuel metering device to the plenum.

3. The fuel management system of claim 1, wherein the fuel metering device is coupled to the inlet port of the thermal reactor, such that the liquid fuel passes through the fuel metering device to the inlet port of the thermal reactor.

4. The fuel management system of claim 1, wherein the fuel metering device is switched between first and second stages in response to the pressure sensing device, the first stage providing fuel vapor from the thermal reactor to the plenum at a first rate to achieve a first predetermined air to fuel vapor ratio, the second stage providing fuel vapor from the thermal reactor to the plenum at a second rate to achieve a second predetermined air to fuel vapor ratio.

5. The fuel management system of claim 4, further comprising an intake air venturi, and wherein the fuel metering device includes a vacuum switch coupled to the intake air venturi, the vacuum switch switching the fuel metering device between the first and second stages in response to the pressure sensing device.

6. The fuel management system of claim 4, further comprising a controller coupled to the fuel metering device to switch the fuel metering device between the first and second stages in response to a predetermined engine parameter.

7. The fuel management system of claim 6, wherein the controller receives an output signal from the pressure sensing device and in response thereto, switches the fuel metering device between the first and second stages.

8. The fuel management system of claim 1, wherein the air intake velocity valve comprises:
   an inlet;
   an outlet;
   an air flow path defined between the inlet and the outlet; and
   a variable air flow restrictor positioned within the air flow path.

9. The fuel management system of claim 8, wherein the air intake velocity valve comprises a rotary valve.

10. The fuel management system of claim 8, wherein the air intake velocity valve comprises a butterfly valve.

11. The fuel management system of claim 1, wherein the thermal reactor comprises:
   a cylinder defining an axial bore therethrough the cylinder receiving the liquid fuel from the inlet port and discharging the fuel vapor through the outlet port; and
   at least one heating element connected to the cylinder to heat the liquid fuel to convert the liquid fuel to the fuel vapor.

12. The fuel management system of claim 11, wherein the at least one heating element comprises a plurality of heating elements disposed in the cylinder, the heating elements arranged such that the liquid fuel contacts the heating elements.

13. The fuel management system of claim 12, wherein the cylinder defines a side wall having a plurality of apertures therethrough, each of the apertures having one of the heating elements extending therethrough such that each heating element projects into the cylinder.

14. The fuel management system of claim 13, wherein each of the heating elements is generally perpendicular to the axis of the cylinder.

15. The fuel management system of claim 13, wherein each of the apertures has a corresponding aperture located about 90 degrees therefrom.

16. The fuel management system of claim 13, wherein the apertures are arranged in two columns, each column being generally parallel to the axis of the cylinder, the columns being positioned about 90 degrees apart.

17. The fuel management system of claim 11, further comprising:
   at least one fuel bar connected to a side wall of the cylinder, the fuel bar defining at least one fuel well in fluid communication with the cylinder, the fuel well defining the inlet port such that the liquid fuel flows into the fuel well;
   wherein the at least one heating element is disposed within the fuel bar so as to heat the liquid fuel within the fuel well to convert the liquid fuel to the fuel vapor.

18. The fuel management system of claim 1, wherein the plenum comprises:
   a generally cylindrical central portion;
   an inlet for receiving the air and fuel vapor mixture; and
   an outlet.

19. The fuel management system of claim 1, wherein the internal combustion engine includes an exhaust manifold and an exhaust pipe coupled thereto, the fuel management system further comprising:
   a pressure sensor to measure back pressure of exhaust gas from the engine; and
   a control valve coupled to the exhaust pipe responsive to the pressure sensor to restrict the exhaust gas and apply back pressure on the engine.

20. A fuel management system for an internal combustion engine fueled by a liquid hydrocarbon, the engine including an intake manifold and a turbocharger, the fuel management system comprising:
   a thermal reactor having an inlet port and an outlet port, the thermal reactor receiving the liquid hydrocarbon fuel through the inlet port, the thermal reactor heating the liquid hydrocarbon fuel to convert the liquid hydrocarbon fuel to a fuel vapor and discharge the fuel vapor through the outlet port;
   a pressure sensing device for measuring pressure within the intake manifold to determine engine load; and
   a fuel metering device connected to the outlet port of the thermal reactor such that the fuel vapor is discharged from the thermal reactor and through the fuel metering device, the fuel metering device regulating the fuel vapor discharged from the thermal reactor in response to the pressure sensing device.

21. The fuel management system of claim 20, wherein the fuel metering device is switched between first and second stages in response to the pressure sensing device, the first stage providing fuel vapor from the thermal reactor to the turbocharger at a first rate to achieve a first predetermined air to fuel vapor ratio, the second stage providing fuel vapor from the thermal reactor to the turbocharger at a second rate to achieve a second predetermined air to fuel vapor ratio.

22. The fuel management system of claim 20, further comprising an air intake velocity valve connected to the fuel metering device, the air intake velocity valve controlling the air mixed with the fuel vapor in response to the pressure sensing device.

23. The fuel management system of claim 20, wherein the internal combustion engine includes a plurality of combustion chambers, the fuel management system further comprising a glow plug system including:
   a plurality of glow plugs corresponding to the combustion chambers, each glow plug including a tip defining a temperature; and
   a plurality of adapters corresponding to the glow plugs, each adapter affixing the corresponding glow plug to the engine such that at least the glow plug tip extends into the combustion chamber;
   wherein the glow plug tip temperature is varied in response to predetermined engine parameters.

24. The fuel management system of claim 23, wherein the glow plug tip temperature is varied from about 1,200° F. to 1,550° F.

25. The fuel management system of claim 20, wherein the internal combustion engine includes a plurality of pre-combustion chambers, the fuel management system further comprising a glow plug system including:
   a plurality of glow plugs corresponding to the pre-combustion chambers, each glow plug including a tip defining a temperature; and
   a plurality of adapters corresponding to the glow plugs, each adapter affixing the corresponding glow plug to the engine such that at least the glow plug tip extends into the pre-combustion chamber;
   wherein the glow plug tip temperature is varied in response to predetermined engine parameters.

26. A fuel management system for an internal combustion engine including an intake manifold, the fuel management system comprising:

a thermal reactor having an inlet port and an outlet port, the thermal reactor receiving liquid fuel through the inlet port, the thermal reactor heating the liquid fuel to convert the liquid fuel to fuel vapor and discharge the fuel vapor through the outlet port;

a pressure sensing device for measuring pressure within the intake manifold to determine engine load;

a plenum coupled to the outlet port to receive the fuel vapor from the outlet port and mix the fuel vapor with air;

a fuel metering device switched between first and second stages in response to the pressure sensing device, the first stage providing fuel vapor from the thermal reactor to the plenum at a first rate to achieve a first predetermined air to fuel vapor ratio, the second stage providing fuel vapor from the thermal reactor to the plenum at a second rate to achieve a second predetermined air to fuel vapor ratio; and a controller switching the fuel metering device between the first and second stages in response to a predetermined engine parameter.

27. The fuel management system of claim 26, wherein the controller receives an output signal from the pressure sensing device and in response thereto, switches the fuel metering device between the first and second stages.

28. A fuel management system for an internal combustion engine including an intake manifold, the fuel management system comprising:

a thermal reactor having an inlet port and an outlet port and a cylinder defining an axial bore therein, the cylinder defining a side wall having a plurality of apertures extending therethrough, the cylinder receiving liquid fuel from the inlet port;

a plurality of heating elements, each aperture having one of the heating elements extending therethrough such that the liquid fuel received into the cylinder contacts the heating elements to heat the liquid fuel so as to convert the liquid fuel to a fuel vapor and discharge the fuel vapor through the outlet port;

a pressure sensing device connected to the thermal reactor for measuring pressure within the intake manifold to determine engine load; and a plenum connected to the thermal reactor outlet port to receive the fuel vapor from the outlet port and mix the fuel vapor with air.

29. A fuel management system for an internal combustion engine including an intake manifold, the fuel management system comprising:

a thermal reactor comprising a cylinder defining an axial bore therein, the cylinder defining a side wall and an outlet port;

at least one fuel bar connected to the side wall, the fuel bar defining at least one fuel well in fluid communication with the cylinder, the fuel well defining an inlet port for receiving liquid fuel into the fuel well;

at least one heating element disposed within the fuel bar, such that the liquid fuel received into the fuel well contacts the heating element to heat the liquid fuel so as to convert the liquid fuel to a fuel vapor and discharge the fuel vapor through the outlet port;

a pressure sensing device connected to the thermal reactor for measuring pressure within the intake manifold to determine engine load; and a plenum connected to the thermal reactor outlet port to receive the fuel vapor from the outlet port and mix the fuel vapor with air.

30. A fuel management system for an internal combustion engine fueled by a liquid hydrocarbon, the engine including an intake manifold and a turbocharger, the fuel management system comprising:

a thermal reactor having an inlet port and an outlet port, the thermal reactor receiving the liquid hydrocarbon fuel through the inlet port;

a plurality of heating elements disposed in the thermal reactor for heating the liquid hydrocarbon fuel to convert the liquid hydrocarbon fuel to a fuel vapor, the fuel vapor being discharged through the outlet port;

a pressure sensing device connected to the thermal reactor for measuring pressure within the intake manifold to determine engine load;

a fuel metering device connected to the outlet port of the thermal reactor to regulate the fuel vapor discharged from the thermal reactor in response to the pressure sensing device; and an air intake velocity valve connected to the fuel metering device, the air intake velocity valve controlling the air mixed with the fuel vapor in response to the pressure sensing device.

* * * * *